Figure 1:
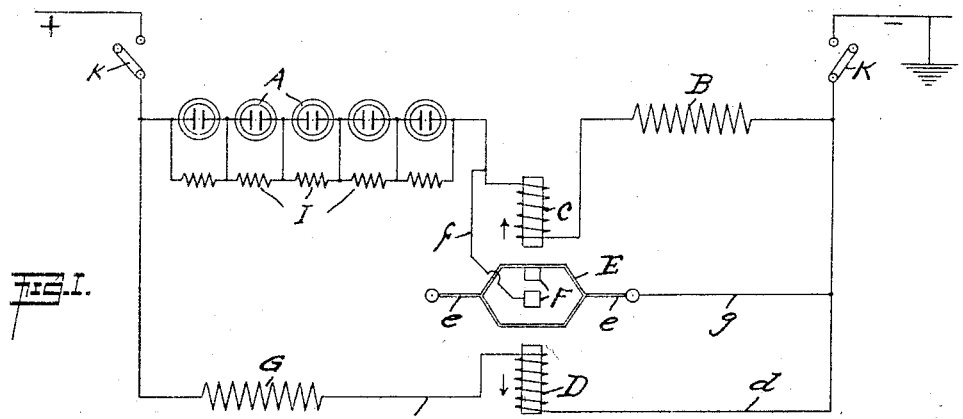

R. P. CLARK.
LIGHTNING ARRESTER.
APPLICATION FILED JAN. 27, 1915.

1,208,484.

Patented Dec. 12, 1916.
2 SHEETS—SHEET 1.

WITNESSES
G. Robert Thomas
E. Greenberger

INVENTOR
R. P. Clark
BY
ATTORNEYS

R. P. CLARK.
LIGHTNING ARRESTER.
APPLICATION FILED JAN. 27, 1915.

1,208,484.

Patented Dec. 12, 1916.
2 SHEETS—SHEET 2.

UNITED STATES PATENT OFFICE.

RHODOLPHUS PHILIP CLARK, OF SHELTER ISLAND, NEW YORK.

LIGHTNING-ARRESTER.

1,208,484. Specification of Letters Patent. Patented Dec. 12, 1916.

Application filed January 27, 1915. Serial No. 4,616.

*To all whom it may concern:*

Be it known that I, RHODOLPHUS PHILIP CLARK, a citizen of the United States, and a resident of Shelter Island, in the county of Suffolk and State of New York, have invented certain new and useful Improvements in Lightning-Arresters, of which the following is a specification.

This invention relates to protective discharge devices, known as lightning arresters, surge protectors, etc., and is more particularly concerned with the type of lightning arrester employing electrolytic condenser cells. These cells, as is well-known, consist essentially of aluminum electrode plates immersed in a suitable electrolyte. By the passage of current an insulating film is formed on the surface of the electrode plates, and it is on this film that the operation of the cell depends. As long as the normal voltage is maintained the insulating film affords an almost complete barrier to the passage of current from the line through the discharge path, but in event of a critical breakdown voltage being exceeded, the cells no longer constitute an obstruction, but offer a free path for the passage of the high frequency or over-voltage discharges to the ground or from line to line, thereby protecting the apparatus which may be connected with the line, without producing short-circuits or causing other disturbances to the service voltage. If the voltage is removed, that is to say if the normal current is cut off, a dissolution of the film in the electrolyte takes place, and, if the cells are left in this condition for a sufficient period, the film will be dissolved to such extent that when the normal voltage is again applied a heavy current will pass. This is to be avoided, because if the current should suddenly be restored with the arrester in this condition, the arrester becomes a short-circuit on the line, thereby destroying itself and causing delay and possible damage to the service. These conditions of disuse of the arrester, with consequent dissolution of the film and subsequent sudden application of voltage, are particularly likely to occur in connection with arresters installed on street cars, which are frequently laid off for repairs. In general, the dissolution of the insulating film in these lightning arresters has presented one of the most difficult problems to solve. In the system which I have devised to overcome this difficulty, there is inserted in series with the arrester, before the application of voltage and during the period of film reformation, a resistance, which will limit the current to a safe value even should the films on the aluminum plates be entirely dissolved at the moment of closing the line switch. Since the current-limiting resistance would not afford a proper discharge path, means are provided whereby the said resistance is short-circuited automatically when the current permitted to pass by the limiting resistance has brought about the normal condition of film insulation in the cells; but the construction is such that the short-circuit is initially open, so that, upon the application of voltage, current can flow through the cells only by way of the current-limiting resistance. Whether through the current-limiting resistance or the short-circuit, the cells are constantly connected with the line circuit; consequently as long as there is voltage on the line the insulating film is maintained. The control of the circuits is effected through a relay, the constitution and relation of which to the other parts of the system may be varied in different specific embodiments, certain of which are illustrated and described.

It is to be understood that the best practice requires that the film on the electrodes of the aluminum cells be formed in the first instance at the factory, by means of devices arranged for that purpose, and before they are installed in actual operating service with the system which I have devised. My invention can, however, be used to form the insulating films of the aluminum plates for the first time, although it is primarily designed to reform the films whenever they become partly or completely dissolved after having been once formed.

In the drawings forming part hereof: Figures 1, 2, 3 and 4 are diagrammatic representations of different forms of the protective device as applied to direct current work; and Fig. 5 is a diagram illustrating an embodiment of the invention suitable for use with alternating currents.

Reference will first be had to Fig. 1. The aluminum cells, of which there are a suitable number connected in series, are designated A, A. These cells are shunted, as is customary, by balancing resistances I, to equalize the voltage between the cells. K, K are the main line switches for the arrester. B is the current-limiting resistance, which is initially in circuit with the condenser cells. E is the armature of a differential relay, which is adapted to close the initially separated contacts F. Means is provided whereby the relay is opened and held open when the current is off. The particular construction and arrangement of the relay whereby it is held open initially and closed subsequent to the application of voltage may be varied. In the particular instance shown, the armature E is an open, lozenge-shaped frame carrying one of the contacts F and supported by spring arms e, which are secured at their inner ends to the armature and fixed at their outer ends to stationary supports. These springs are so arranged as to tend to separate the contacts, and do separate them when no current is passed. In accordance with the invention the relay is closed only after the limited current permitted to flow through the cells by the resistance B has formed the requisite film on the electrodes of the cells, so that there is no longer any danger of the arrester becoming a short-circuit on the line if the resistance is eliminated. In the embodiment of the invention under discussion, the means whereby this result is accomplished comprise differential windings C and D, the winding C being connected in series with the cells and also with the current-limiting resistance B, while the coil or winding D is included in a circuit d which is in shunt relation to the cells and also to the resistance B. The said shunt circuit includes a regulating resistance G. With the main line switch K, K open, and consequently with no voltage on the cells, the condition of the armature E and the contacts F is as shown, that is, the contacts are open, this condition being maintained by the spring arms e as explained. If in the cells the insulating films have been more or less dissolved, then when the switches K, K are closed the current will be established in two circuits. In one circuit it passes through the cells A, A and their balancing resistances I, through the series coil C and the current-limiting resistance B. The other circuit is the shunt circuit d containing the shunt relay coil D. Since the insulating film in the cells is in an unformed condition, a current in excess of the normal value will pass through the first described circuit. This current will cause the series coil C to act on the armature in the direction indicated by the arrow, that is to say, in the direction tending to keep the contacts F separated. So long as the current through the cells A, A, and consequently through the series coil C, exceeds the normal value, the series coil C, acting with the spring e, will keep the contacts open, thereby causing the current-limiting resistance B to remain in circuit. Due to the film-forming action of the current in this circuit, however, the current will diminish in value in accordance with the formation of the film. This causes the pull of the series coil C to diminish in force until such time as its pull, combined with the resistance of the spring arms e to the closing of the contacts, is less than the pull of the shunt coil D. In the particular form of the invention under discussion the voltage in the shunt circuit d remains constant, and the pull of the shunt coil is, therefore, constant; and it will be understood that the parts are so related and proportioned that this constant pull of the shunt coil is substantially less than the initial opposite pull of the series coil C plus the opposition which the springs e offer to movement of the armature E in the closing direction. Manifestly, the force of the spring arms must be less than the force of the shunt coil D, otherwise the shunt coil could not close the contacts when there is little or no current in the series coil C. The shunt coil D must have sufficient force, regulated by the value of the resistance G and the character of the coil itself, to overpower the springs e and the force of the series coil C when the current passing through the cells A and the series coil diminishes to the desired normal minimum amount, or at least to an amount which corresponds to a degree of film formation which will render it safe to short-circuit the resistance B. When the shunt coil of the relay thus asserts itself, a short-circuit is completed around the resistance B through the conductors f, g and the contacts F. In Fig. 1 this shunt also short-circuits the series coil C. Under this condition, that is to say with the relay closed, the discharge path includes the cells A, the conductor f, closed contacts F, and conductor g.

Figure 2:
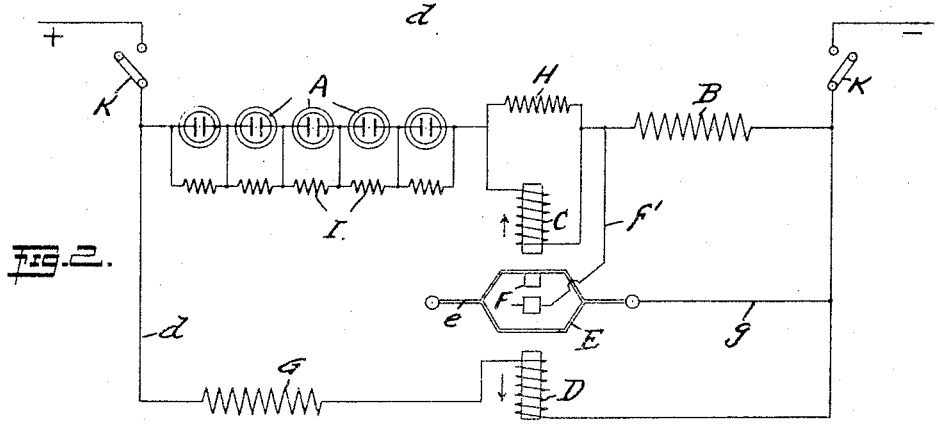
Figure 3:
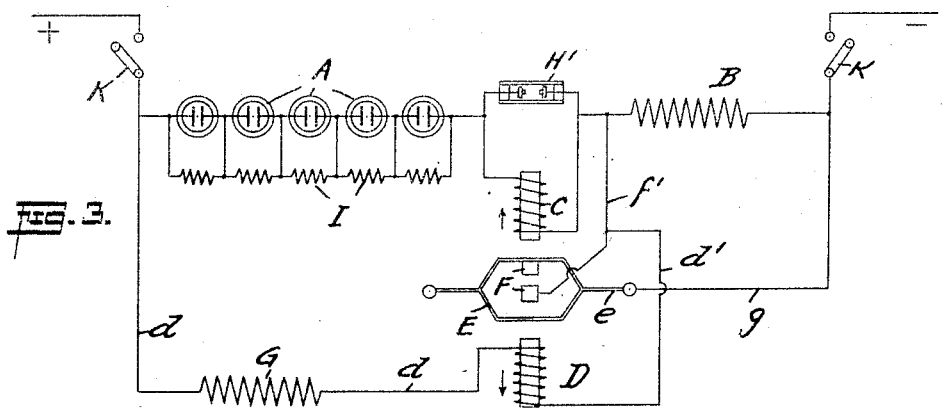

The wiring shown in Fig. 2 differs from that of Fig. 1 in that the conductor f' is so arranged that the current-limiting resistance B, but not the series coil C is short-circuited when the relay is closed. With this arrangement a non-inductive resistance H, for which may be substituted the low voltage spark gap H' of Fig. 3, is connected in shunt to the series coil C, in order to by-pass any high frequency discharges which would find difficulty in going through the series coil C. The advantage of retaining the coil C in series with the cells when the insulating film is formed and the short-circuit closed is that, if any or all of the aluminum cells should fail while in service, the series coil of the relay would be traversed by the increased current, due to such failure, and the resulting increased pull of the coil would cause the short-circuiting contacts to open and thereby insert the current-limiting resistance B in series with the aluminum cells, thereby reducing the increased current through the cells and relay to a safe value.

Fig. 3 illustrates a modification of the protective device wherein the shunt coil D of the relay is in series with the current-limiting resistance B through a conductor $d'$ forming part of the shunt circuit $d$. This connection has the following advantage: When the shunt relay windings and their regulating resistance G are in series with the current-limiting resistance B, the relay coil D can act with the required force to close the short-circuit only when the voltage across resistance B is a minimum. It will be perceived that at the outset only a light current will pass through the winding D and that this current will increase as the cells become formed and diminish the voltage drop across the resistance B, thereby allowing the shunt coil D to absorb more power. While the shunt winding increases in power, the series winding exerts a diminishing pull for the reason explained in connection with Fig. 1.

Figure 4:
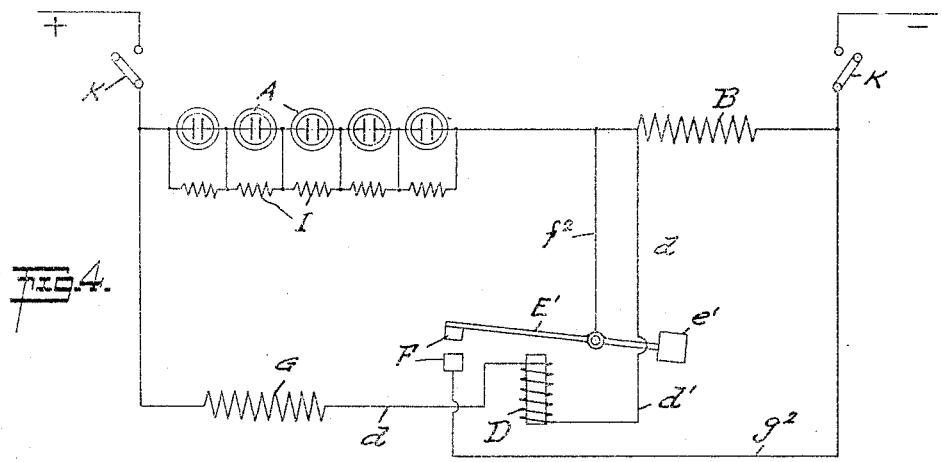
Figure 5:
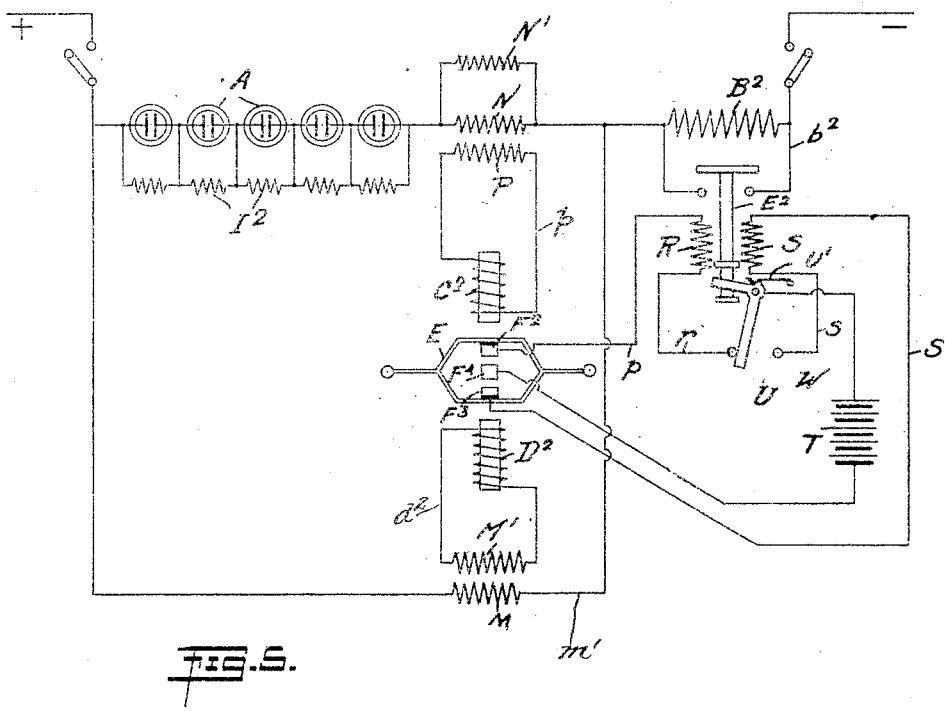

Fig. 4 illustrates the fact that a relay having a single winding may be utilized instead of a differential relay. This system makes use of a connection, such for example as that described in connection with Fig. 3, whereby the pull of the shunt coil D is variable, increasing from a minimum, which is ineffective to close the relay armature E' against the action of suitable mechanical means tending to hold it open, to a value attained only when the cells are sufficiently formed, which the relay and thereby completes the short-circuit $f^2$, $g^2$. In this view there is shown a different pivoted form of armature, and, instead of a spring or springs for holding the contacts F open when the current is off, a weight $e'$ is shown as the mechanical equivalent. This weight, however, or the spring which may be substituted for it, must be of such value relatively to the coil D as to hold the relay open against the pull of this coil until such time as the force exerted by the coil has increased to a value which corresponds to the requisite condition of film formation in the cells. In other words, the weight or spring in this instance takes the place of both the springs and the series coil in the other forms of the invention. It will be understood that in these other forms, also, the force of gravity may be utilized instead of resilient force for holding the relay open before the application of voltage.

It will be understood that numerous other modifications of the invention may be devised for use in connection with direct current. For example, it will be obvious that the short-circuit, instead of being opened with a gap, may be opened by the insertion of a sufficiently great resistance and closed by cutting out such resistance. The shunt coil D may be wound or constructed so as to have a large time-constant,—that is, that due to the self inductance of the coil windings there is considerable delay between the application of the voltage and the manifestation of the coil's greatest force. This permits of obtaining the desirable effect of allowing more time between the application of voltage on the cells and the production of the maximum effect of the force tending to close the short-circuit of the current-limiting resistance. Furthermore, it is to be understood that instead of a separate resistance G, the shunt coil may be so constructed as to offer sufficient resistance in itself.

The diagram of Fig. 5 illustrates one mode of applying the invention to alternating currents. A, A are the aluminum cells, $I^2$, $I^2$ their balancing resistances or inductances. M is the primary of a potential transformer which is connected in series with the current-limiting resistance (or reactance) $B^2$ by the connection $m'$. M' is the secondary winding of this potential transformer, which is included in the shunt secondary circuit $d^2$ containing the shunt coil $D^2$. A winding N in series with the cells constitutes the primary of a current transformer, of which P is the secondary winding contained in the secondary circuit $p$ having the series relay winding $C^2$ therein. The winding N is shunted by a by-pass resistance N' for current transmission. The armature E may be as in Figs. 1 to 3, but carries two movable contacts $F^2$, $F^3$, which coöperate with an intermediate fixed contact $F^4$, though manifestly this arrangement of contacts could be reversed. $E^2$ is an oil switch or other suitable switch for short-circuiting the current-limiting resistance (or reactance) $B^2$, $b^2$ being the initially open short-circuit. R and S represent, respectively, coils for closing and opening the switch, the circuits $r$ and $s$ of these coils being controlled by the contacts $F^2$, $F^3$, $F^4$ in the manner which will be obvious. T is the battery or source of power for energizing the opening and closing coils S and R. U represents any suitable or known form of mechanical trip operated by the switch $E^2$ in such fashion that, when the switch is closed, the trip is thrown from the closing contact V to the opening contact W, thereby disconnecting the switch-closing coil R from the battery and connecting the opening coil S to the battery. Conversely, when the switch $E^2$ is opened, the trip U is thrown to the closing contact V, thereby disconnecting the switch-opening coil S from the battery and connecting the coil R therewith. A spring U' is shown in connection with the trip U for completing the movement of this member in either direction after such movement has been initiated by the switch $E^2$. Contacts $F^2$ and $F^3$ are, of course, insulated from each other.

As far as the connection to ground is concerned it will be understood that the system may be arranged in any preferred or known manner. Fig. 1 illustrates the negative line grounded, but, of course, there are numerous other permissible arrangements.

What I claim as new is:

1. In a protective device, the combination with an electrolytic condenser, of current-limiting means in series therewith, and means for automatically short-circuiting said current-limiting means only when the requisite condition of film formation has been attained within the cell.

2. In a protective device, the combination with an electrolytic condenser cell, of a current-limiting resistance in series with the cell, an initially open short-circuit in shunt relation to said resistance, and means for closing said short-circuit automatically when the requisite condition of film formation has been attained within the cell.

3. In a lightning arrester, the combination with an electrolytic condenser cell, of a current-limiting resistance initially in series with the cell, and a circuit in shunt relation to the cell and including means for short-circuiting said resistance automatically when the requisite condition of film formation has been attained within the cell.

4. The combination with a lightning arrester cell, of a current-limiting resistance through which the cell is initially connected in the line circuit, an initially open short-circuit adapted to connect the cell with the line, and means including a shunt circuit and a relay for closing said short-circuit after the insulating film of the cell has been formed by the current passed through the current-limiting resistance.

5. In a protective device, the combination of an electrolytic condenser cell, a current-limiting resistance initially in series therewith, an initially open short-circuit in shunt relation to said resistance, a shunt circuit including a regulating resistance and a relay coil, and the said relay adapted to close said short-circuit when the requisite condition of film formation has been attained within the cell.

6. The combination with a cell of the character described, of a current-limiting means initially in series with the cell, an initially open short-circuit in shunt relation to said current-limiting means, and means including a circuit acting on a relay for closing said short-circuit after the requisite film has been formed in the cell by the current allowed to pass by the current-limiting means.

7. The combination of a cell of the character described, a current-limiting resistance initially in series therewith, means including a relay for automatically short-circuiting said resistance after the formation of a requisite insulating film in the cell by the current allowed to pass by the current-limiting means, and means for holding said relay open before the application of voltage.

8. The combination of a cell of the character described, current-limiting means initially in series therewith, means including a relay for automatically short-circuiting said current-limiting means after the formation of a requisite insulating film in the cell by the current allowed to pass by the current-limiting means, and mechanical means for holding said relay open before the application of voltage.

9. In a protective device, the combination of an electrolytic condenser cell, current-limiting means initially in series therewith, an initially open short-circuit in shunt relation to the current-limiting means, a relay for closing said short-circuit, means initially holding the relay open, and electrical means opposed to the last-mentioned means and adapted to become effective to close said relay when a predetermined condition of film formation in the cell has been attained.

10. In a protective device, the combination of an electrolytic condenser cell, current-limiting means initially in series therewith, and means including a differential relay for automatically short-circuiting said resistance when the requisite condition of film formation has been attained within the cell.

11. In a protective device, the combination of an electrolytic condenser cell, current-limiting means initially in series therewith, an initially open short-circuit in shunt relation to said current-limiting means, a relay for closing said short-circuit, means for holding said relay open before the application of voltage, and differential electrical means adapted to act upon the relay to effect the closing of the short-circuit after the insulating film of the cell has been formed by the current allowed to pass by the current-limiting means.

12. In a protective device, the combination of a cell of the character described, a current-limiting resistance through which the cell is connected with the line upon the application of voltage, a relay for short-circuiting said resistance, a coil in series with the cell adapted to hold the relay open for a time after the application of voltage, and a shunt coil adapted to overcome the series coil to close the relay when the requisite condition of film formation has been attained within the cell.

13. In a protective device, the combination of a cell of the character described, a current-limiting resistance through which the cell is connected with the line upon the application of voltage, a relay for short-circuiting said resistance, means for opening and keeping the relay open when the current is off, a coil acting with said means to hold the relay open for a time after the application of voltage, and a coil acting in the opposite sense and adapted to overcome the other forces in order to close the relay after the requisite film has been formed in the cell.

14. In a protective device, the combination of an electrolytic condenser cell, means for limiting the current passed through the same upon the application of voltage, means for short-circuiting said current-limiting means upon the formation of a requisite insulating film in the cell, said short-circuiting means comprising a differential relay having coils acting in opposition to each other, the connections being such that the coil tending to open the short-circuit is retained in series with the cells when the current-limiting means is short-circuited.

15. In a protective device, the combination of an electrolytic condenser cell, a current-limiting resistance initially in series with the cell, and means for short-circuiting said current-limiting resistance after the formation of a requisite film in the cell, said means including a relay having a coil tending to close the same to establish the short-circuit, and means connecting said coil in series with said current-limiting resistance, the relation being such that the force of the said coil is of increasing value as the voltage across the said resistance decreases owing to the formation of the insulating film.

16. In a protective device, the combination of an electrolytic condenser cell, a current-limiting resistance initially in series with the cell, and means for short-circuiting said current-limiting resistance after the formation of a requisite film in the cell, said means including a relay, a coil tending to close said relay, said coil having a regulating resistance connected in series therewith to regulate the current permitted to pass through the coil, means opposing the action of said coil, and means connecting said coil and regulating resistance in series with the current-limiting resistance.

17. In a protective device, the combination of an electrolytic condenser cell, a current-limiting resistance initially in series with the cell, and means for short-circuiting said current-limiting resistance comprising a differential relay having opposing coils, the coil tending to open the relay being in series with the cell and the current-limiting resistance, and the coil tending to close the relay being in series with the said current-limiting resistance and in shunt to the cell.

18. In a protective device, the combination of an electrolytic condenser cell, a current-limiting resistance initially in series therewith, means for short-circuiting said current-limiting resistance comprising a differential relay having opposing coils and means to hold the relay open when current is off, means for including in the short-circuit the coil which tends to open the relay, and a by-pass for high frequency discharges shunting said coil.

19. A direct current lightning arrester, comprising an electrolytic condenser cell, a current-limiting resistance initially in series therewith, an initially open short-circuit in shunt relation to said resistance, a relay controlling said short-circuit, means whereby said relay is open when current is off, and electrical means connected with the line for closing said relay and operative to close the relay after the formation of the insulating film in the cell.

20. In a protective device, the combination of an electrolytic condenser cell, current-limiting means initially in series therewith, an initially open short-circuit in shunt relation to said current-limiting means, means for holding said short-circuit open until the cell has been formed by current permitted to pass therethrough by the current-limiting means, and means for thereupon automatically closing the short-circuit.

21. In a device for protecting electric plants against excess voltage, and in combination, an electrolytic condenser, a resistance in series with said condenser, a shunt circuit in relation to said resistance, contacts in said shunt circuit and an electromagnetic device for operating said contacts to close the said shunt circuit dependent upon the requisite condition of film formation in the condenser.

22. In a device for protecting electric plants against excess voltage, and in combination, a circuit, an electrolytic condenser in said circuit, a resistance also in said circuit, and in series with said condenser, a shunt circuit in relation to said resistance, normally open contacts in said shunt circuit, and electro-magnetic means for operating said contacts to close and open said shunt circuit dependent upon the condition of film formation in the condenser.

23. In a device for protecting electric plants against excess voltage and in combination, a circuit, an electrolytic condenser in said circuit, a resistance placed across the terminals of said condenser, a resistance also in said circuit and in series with said condenser, a shunt circuit in relation to said resistance, normally open contacts in said shunt circuit, and electro-magnetic means for operating said contacts to close and open said shunt circuit dependent upon the condition of film formation in the condenser.

24. In a device for protecting electric plants against excess voltage and in combination, an electrolytic condenser, a resistance in series therewith, a shunt circuit in relation to said resistance, a shunt circuit in relation to said condenser, an electromagnetic device, the coil of which is in the shunt circuit in relation to the condenser, a second electro-magnetic device, the coil of which is in series with the said condenser and resistance, and contacts operated by the said electro-magnetic devices for controlling the shunt circuit in relation to the resistance in a manner dependent upon the requisite condition of film formation in the condenser.

25. In a device for protecting electric plants against excess voltage and in combination, a circuit, an electrolytic condenser therein, a resistance in series with said condenser in said circuit, a shunt circuit in relation to said resistance, a shunt circuit in relation to said condenser, an electro-magnetic device, the coil of which is in the shunt circuit in relation to the said condenser, an electro-magnetic device, the coil of which is in series with the said circuit of the condenser and resistance, contacts, an armature actuated by both electro-magnetic devices, and a connection between said armature and said contacts whereby the contacts are operated through the armature to control the shunt circuit in relation to the said resistance in a manner dependent upon the requisite condition of film formation in said condenser.

In testimony whereof I have signed my name in the presence of two subscribing witnesses.

RHODOLPHUS PHILIP CLARK.

Witnesses:
LAURETTA M. LEARY,
HENRY H. EARL.